(12) United States Patent
Tiwari

(10) Patent No.: US 8,638,762 B2
(45) Date of Patent: Jan. 28, 2014

(54) SYSTEM AND METHOD FOR NETWORK INTEGRITY

(75) Inventor: Manish Tiwari, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 417 days.

(21) Appl. No.: 11/351,104

(22) Filed: Feb. 8, 2006

(65) Prior Publication Data

US 2007/0183375 A1  Aug. 9, 2007

(51) Int. Cl.
H04W 4/00 (2009.01)

(52) U.S. Cl.
USPC .......... 370/338; 370/328; 370/310; 370/330; 713/161; 713/160; 713/155

(58) Field of Classification Search
None
See application file for complete search history.

(56) References Cited

U.S. PATENT DOCUMENTS

| | | | |
|---|---|---|---|
| 3,641,433 A | 2/1972 | Mifflin et al. |
| 4,168,400 A | 9/1979 | De Couasnon et al. |
| 4,176,316 A | 11/1979 | DeRoas et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |

(Continued)

FOREIGN PATENT DOCUMENTS

| EP | 0 992 921 A2 | 4/2000 |
|---|---|---|
| EP | 1 542 409 A | 6/2005 |

(Continued)

OTHER PUBLICATIONS

U.S. Appl. No. 11/487,722, filed Jul. 2006, Simons et al.

(Continued)

*Primary Examiner* — Anez Ebrahim

(57) ABSTRACT

A technique for maintaining network integrity is disclosed. A system according to the technique may include a wired network, a switch, and a wireless access point. The switch can be coupled to the wired network and the wireless access point can be coupled to the switch. The system may further include a forwarding database that stores a mac address for a plurality of devices seen by the switch on the wired network. A method according to the technique may involve detecting identifying information of a device by a wireless access point. The identifying information can be compared with the mac addresses in a forwarding database. If the device is unknown, the unknown device can be classified as rogue and countermeasures can be taken against the rogue device.

24 Claims, 8 Drawing Sheets

(56) References Cited

U.S. PATENT DOCUMENTS

| | | |
|---|---|---|
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Lim |
| 5,231,633 A | 7/1993 | Hluchyj et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten et al. |
| 5,339,316 A | 8/1994 | Diepstraten |
| 5,371,783 A | 12/1994 | Rose et al. |
| 5,418,812 A | 5/1995 | Reyes et al. |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,734,699 A | 3/1998 | Lu et al. |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright |
| 6,088,591 A | 7/2000 | Trompower |
| 6,101,539 A * | 8/2000 | Kennelly et al. ............... 709/223 |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Birukawa et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watanabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |

(56) References Cited

U.S. PATENT DOCUMENTS

| | | | |
|---|---|---|---|
| 6,567,416 B1 | 5/2003 | Chuah | |
| 6,574,240 B1 | 6/2003 | Tzeng | |
| 6,580,700 B1 | 6/2003 | Pinard et al. | |
| 6,587,680 B1 | 7/2003 | Ala-Laurila et al. | |
| 6,587,835 B1 | 7/2003 | Treyz et al. | |
| 6,603,970 B1 | 8/2003 | Platas et al. | |
| 6,614,787 B1 | 9/2003 | Jain et al. | |
| 6,615,276 B1 | 9/2003 | Mastrianni et al. | |
| 6,624,762 B1 | 9/2003 | End, III | |
| 6,625,454 B1 | 9/2003 | Rappaport et al. | |
| 6,631,267 B1 | 10/2003 | Clarkson et al. | |
| 6,650,912 B2 | 11/2003 | Chen et al. | |
| 6,658,389 B1 | 12/2003 | Alpdemir | |
| 6,659,947 B1 | 12/2003 | Carter et al. | |
| 6,674,403 B2 | 1/2004 | Gray et al. | |
| 6,677,894 B2 | 1/2004 | Sheynblat et al. | |
| 6,678,516 B2 | 1/2004 | Nordman et al. | |
| 6,678,802 B2 | 1/2004 | Hickson | |
| 6,687,498 B2 | 2/2004 | McKenna et al. | |
| 6,697,415 B1 | 2/2004 | Mahany | |
| 6,721,334 B1 | 4/2004 | Ketcham | |
| 6,725,260 B1 | 4/2004 | Philyaw | |
| 6,738,629 B1 | 5/2004 | McCormick et al. | |
| 6,747,961 B1 | 6/2004 | Ahmed et al. | |
| 6,756,940 B2 | 6/2004 | Oh et al. | |
| 6,760,324 B1 | 7/2004 | Scott et al. | |
| 6,785,275 B1 | 8/2004 | Boivie et al. | |
| 6,798,788 B1 | 9/2004 | Viswanath et al. | |
| 6,801,782 B2 | 10/2004 | McCrady et al. | |
| 6,826,399 B1 | 11/2004 | Hoffman et al. | |
| 6,839,338 B1 | 1/2005 | Amara et al. | |
| 6,839,348 B2 | 1/2005 | Tang et al. | |
| 6,839,388 B2 | 1/2005 | Vaidyanathan | |
| 6,847,620 B1 | 1/2005 | Meier | |
| 6,847,892 B2 | 1/2005 | Zhou et al. | |
| 6,856,800 B1 | 2/2005 | Henry et al. | |
| 6,879,812 B2 | 4/2005 | Agrawal et al. | |
| 6,901,439 B1 | 5/2005 | Bonasia et al. | |
| 6,917,688 B2 | 7/2005 | Yu et al. | |
| 6,934,260 B1 | 8/2005 | Kanuri | |
| 6,937,566 B1 | 8/2005 | Forslow | |
| 6,938,079 B1 | 8/2005 | Anderson et al. | |
| 6,957,067 B1 * | 10/2005 | Iyer et al. | 455/435.1 |
| 6,973,622 B1 | 12/2005 | Rappaport et al. | |
| 6,978,301 B2 | 12/2005 | Tindal | |
| 6,980,533 B1 | 12/2005 | Abraham et al. | |
| 6,985,469 B2 | 1/2006 | Leung | |
| 6,993,683 B2 | 1/2006 | Bhat et al. | |
| 6,996,630 B1 | 2/2006 | Masaki et al. | |
| 7,013,157 B1 | 3/2006 | Norman et al. | |
| 7,020,438 B2 | 3/2006 | Sinivaara et al. | |
| 7,020,773 B1 | 3/2006 | Otway et al. | |
| 7,024,199 B1 | 4/2006 | Massie et al. | |
| 7,024,394 B1 | 4/2006 | Ashour et al. | |
| 7,027,773 B1 | 4/2006 | McMillin | |
| 7,031,705 B2 | 4/2006 | Grootwassink | |
| 7,035,220 B1 | 4/2006 | Simcoe | |
| 7,039,037 B2 | 5/2006 | Wang et al. | |
| 7,058,414 B1 | 6/2006 | Rofheart et al. | |
| 7,062,566 B2 | 6/2006 | Amara et al. | |
| 7,068,999 B2 * | 6/2006 | Ballai | 455/411 |
| 7,079,537 B1 | 7/2006 | Kanuri et al. | |
| 7,089,322 B1 | 8/2006 | Stallmann | |
| 7,092,529 B2 | 8/2006 | Yu et al. | |
| 7,110,756 B2 | 9/2006 | Diener | |
| 7,116,979 B2 | 10/2006 | Backes et al. | |
| 7,126,913 B1 | 10/2006 | Patel et al. | |
| 7,134,012 B2 | 11/2006 | Doyle et al. | |
| 7,139,829 B2 | 11/2006 | Wenzel et al. | |
| 7,142,867 B1 | 11/2006 | Gandhi et al. | |
| 7,146,166 B2 | 12/2006 | Backes et al. | |
| 7,155,236 B2 | 12/2006 | Chen et al. | |
| 7,155,518 B2 | 12/2006 | Forslow et al. | |
| 7,158,777 B2 | 1/2007 | Lee et al. | |
| 7,159,016 B2 | 1/2007 | Baker | |
| 7,221,927 B2 | 5/2007 | Kolar et al. | |
| 7,224,970 B2 | 5/2007 | Smith et al. | |
| 7,239,862 B1 | 7/2007 | Clare et al. | |
| 7,246,243 B2 | 7/2007 | Uchida | |
| 7,263,366 B2 | 8/2007 | Miyashita | |
| 7,274,730 B2 | 9/2007 | Nakabayashi | |
| 7,280,495 B1 | 10/2007 | Zweig et al. | |
| 7,290,051 B2 | 10/2007 | Dobric et al. | |
| 7,293,136 B1 | 11/2007 | More et al. | |
| 7,310,664 B1 | 12/2007 | Merchant et al. | |
| 7,317,914 B2 * | 1/2008 | Adya et al. | 455/421 |
| 7,320,070 B2 | 1/2008 | Baum | |
| 7,324,468 B2 | 1/2008 | Fischer | |
| 7,324,487 B2 | 1/2008 | Saito | |
| 7,324,489 B1 | 1/2008 | Iyer et al. | |
| 7,349,412 B1 | 3/2008 | Jones et al. | |
| 7,350,077 B2 | 3/2008 | Meier et al. | |
| 7,359,676 B2 | 4/2008 | Hrastar | |
| 7,370,362 B2 * | 5/2008 | Olson et al. | 726/25 |
| 7,376,080 B1 | 5/2008 | Riddle et al. | |
| 7,379,423 B1 | 5/2008 | Caves et al. | |
| 7,382,756 B2 | 6/2008 | Barber et al. | |
| 7,417,953 B2 | 8/2008 | Hicks et al. | |
| 7,421,248 B1 | 9/2008 | Laux et al. | |
| 7,421,487 B1 | 9/2008 | Peterson et al. | |
| 7,440,416 B2 | 10/2008 | Mahany et al. | |
| 7,443,823 B2 | 10/2008 | Hunkeler et al. | |
| 7,447,502 B2 | 11/2008 | Buckley | |
| 7,451,316 B2 | 11/2008 | Halasz et al. | |
| 7,460,855 B2 | 12/2008 | Barkley et al. | |
| 7,466,678 B2 | 12/2008 | Cromer et al. | |
| 7,475,130 B2 | 1/2009 | Silverman | |
| 7,477,894 B1 | 1/2009 | Sinha | |
| 7,480,264 B1 | 1/2009 | Duo et al. | |
| 7,483,390 B2 | 1/2009 | Rover et al. | |
| 7,489,648 B2 | 2/2009 | Griswold | |
| 7,493,407 B2 | 2/2009 | Leedom et al. | |
| 7,505,434 B1 | 3/2009 | Backes | |
| 7,509,096 B2 | 3/2009 | Palm et al. | |
| 7,529,925 B2 | 5/2009 | Harkins | |
| 7,551,574 B1 | 6/2009 | Peden, II et al. | |
| 7,551,619 B2 | 6/2009 | Tiwari | |
| 7,558,266 B2 | 7/2009 | Hu | |
| 7,570,656 B2 | 8/2009 | Raphaeli et al. | |
| 7,573,859 B2 | 8/2009 | Taylor | |
| 7,577,453 B2 | 8/2009 | Matta | |
| 7,592,906 B1 | 9/2009 | Hanna et al. | |
| 7,603,119 B1 | 10/2009 | Durig et al. | |
| 7,636,363 B2 | 12/2009 | Chang et al. | |
| 7,680,501 B2 | 3/2010 | Sillasto et al. | |
| 7,693,526 B2 | 4/2010 | Qian et al. | |
| 7,715,432 B2 | 5/2010 | Bennett | |
| 7,716,379 B2 | 5/2010 | Ruan et al. | |
| 7,724,703 B2 | 5/2010 | Matta et al. | |
| 7,724,704 B2 | 5/2010 | Simons et al. | |
| 7,729,278 B2 | 6/2010 | Chari et al. | |
| 7,733,868 B2 | 6/2010 | Van Zijst | |
| 7,746,897 B2 | 6/2010 | Stephenson et al. | |
| 7,788,475 B2 | 8/2010 | Zimmer et al. | |
| 7,805,529 B2 | 9/2010 | Galluzzo et al. | |
| 7,817,554 B2 | 10/2010 | Skog et al. | |
| 7,844,298 B2 | 11/2010 | Riley | |
| 7,865,713 B2 | 1/2011 | Chesnutt et al. | |
| 7,873,061 B2 | 1/2011 | Gast et al. | |
| 7,894,852 B2 | 2/2011 | Hansen | |
| 7,912,982 B2 | 3/2011 | Murphy | |
| 7,920,548 B2 | 4/2011 | Lor et al. | |
| 7,929,922 B2 | 4/2011 | Kubo | |
| 7,945,399 B2 | 5/2011 | Nosovitsky et al. | |
| 7,986,940 B2 | 7/2011 | Lee et al. | |
| 8,019,082 B1 | 9/2011 | Wiedmann et al. | |
| 8,116,275 B2 | 2/2012 | Matta et al. | |
| 8,150,357 B2 | 4/2012 | Aragon | |
| 8,161,278 B2 | 4/2012 | Harkins | |
| 2001/0024953 A1 | 9/2001 | Balogh | |
| 2002/0021701 A1 | 2/2002 | Lavian et al. | |
| 2002/0052205 A1 | 5/2002 | Belostofsky et al. | |
| 2002/0060995 A1 | 5/2002 | Cervello et al. | |
| 2002/0062384 A1 | 5/2002 | Tso | |

(56) References Cited

U.S. PATENT DOCUMENTS

| | | |
|---|---|---|
| 2002/0069278 A1 | 6/2002 | Forslow |
| 2002/0078361 A1 | 6/2002 | Giroux et al. |
| 2002/0080790 A1 | 6/2002 | Beshai |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0116655 A1 | 8/2002 | Lew et al. |
| 2002/0157020 A1* | 10/2002 | Royer ............................ 713/201 |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018889 A1 | 1/2003 | Burnett et al. |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1* | 7/2003 | Macaulay ...................... 713/201 |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1* | 1/2004 | Whelan et al. .................. 713/201 |
| 2004/0008652 A1* | 1/2004 | Tanzella et al. ................ 370/338 |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0049699 A1* | 3/2004 | Griffith et al. ................. 713/201 |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0064591 A1* | 4/2004 | Noble ............................ 709/250 |
| 2004/0068668 A1* | 4/2004 | Lor et al. ...................... 713/201 |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0143428 A1 | 7/2004 | Rappaport et al. |
| 2004/0143755 A1 | 7/2004 | Whitaker et al. |
| 2004/0165545 A1* | 8/2004 | Cook ............................ 370/315 |
| 2004/0174900 A1 | 9/2004 | Volpi et al. |
| 2004/0184475 A1 | 9/2004 | Meier |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0252656 A1 | 12/2004 | Shiu et al. |
| 2004/0255167 A1* | 12/2004 | Knight ........................... 713/201 |
| 2004/0259542 A1 | 12/2004 | Viitamaki et al. |
| 2004/0259552 A1* | 12/2004 | Ihori et al. ..................... 455/445 |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025103 A1* | 2/2005 | Ko et al. ........................ 370/338 |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037733 A1* | 2/2005 | Coleman et al. ............... 455/411 |
| 2005/0037818 A1 | 2/2005 | Seshadri et al. |
| 2005/0040968 A1 | 2/2005 | Damarla et al. |
| 2005/0054326 A1* | 3/2005 | Rogers ........................... 455/410 |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1* | 3/2005 | Thomson et al. ............... 455/446 |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1* | 5/2005 | Challener et al. .............. 713/155 |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0166072 A1* | 7/2005 | Converse et al. .............. 713/201 |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0259597 A1 | 11/2005 | Benedetotto et al. |
| 2005/0259611 A1 | 11/2005 | Bhagwat et al. |
| 2005/0270992 A1 | 12/2005 | Sanzgiri et al. |
| 2005/0273442 A1 | 12/2005 | Bennett |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1 | 4/2006 | Pirzada et al. |
| 2006/0094440 A1 | 5/2006 | Meier et al. |
| 2006/0098607 A1 | 5/2006 | Zeng et al. |
| 2006/0104224 A1* | 5/2006 | Singh et al. ................... 370/310 |
| 2006/0114872 A1 | 6/2006 | Hamada |
| 2006/0117174 A1 | 6/2006 | Lee |
| 2006/0128415 A1* | 6/2006 | Horikoshi et al. ............. 455/522 |
| 2006/0143496 A1 | 6/2006 | Silverman |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0173844 A1 | 8/2006 | Zhang et al. |
| 2006/0174336 A1 | 8/2006 | Chen |
| 2006/0178168 A1 | 8/2006 | Roach |
| 2006/0182118 A1 | 8/2006 | Lam et al. |

(56) References Cited

U.S. PATENT DOCUMENTS

| | | | |
|---|---|---|---|
| 2006/0189311 A1* | 8/2006 | Cromer et al. | 455/434 |
| 2006/0190721 A1 | 8/2006 | Kawakami et al. | |
| 2006/0193258 A1* | 8/2006 | Ballai | 370/230 |
| 2006/0200862 A1* | 9/2006 | Olson et al. | 726/23 |
| 2006/0206582 A1 | 9/2006 | Finn | |
| 2006/0215601 A1 | 9/2006 | Vleugels et al. | |
| 2006/0217131 A1 | 9/2006 | Alizadeh-Shabdiz et al. | |
| 2006/0245393 A1 | 11/2006 | Bajic | |
| 2006/0248229 A1 | 11/2006 | Saunderson et al. | |
| 2006/0248331 A1 | 11/2006 | Harkins | |
| 2006/0268696 A1 | 11/2006 | Konstantinov et al. | |
| 2006/0274774 A1 | 12/2006 | Srinivasan et al. | |
| 2006/0276192 A1 | 12/2006 | Dutta et al. | |
| 2006/0285489 A1 | 12/2006 | Francisco et al. | |
| 2006/0292992 A1 | 12/2006 | Tajima et al. | |
| 2007/0002833 A1 | 1/2007 | Bajic | |
| 2007/0008884 A1 | 1/2007 | Tang | |
| 2007/0010248 A1 | 1/2007 | Dravida et al. | |
| 2007/0011318 A1 | 1/2007 | Roth | |
| 2007/0025265 A1* | 2/2007 | Porras et al. | 370/252 |
| 2007/0025306 A1 | 2/2007 | Cox et al. | |
| 2007/0027964 A1 | 2/2007 | Herrod et al. | |
| 2007/0054616 A1 | 3/2007 | Culbert | |
| 2007/0058598 A1 | 3/2007 | Ling | |
| 2007/0064673 A1 | 3/2007 | Bhandaru et al. | |
| 2007/0064718 A1 | 3/2007 | Ekl et al. | |
| 2007/0067823 A1* | 3/2007 | Shim et al. | 726/2 |
| 2007/0070937 A1 | 3/2007 | Demirhan et al. | |
| 2007/0076694 A1 | 4/2007 | Iyer et al. | |
| 2007/0081477 A1 | 4/2007 | Jakkahalli et al. | |
| 2007/0082677 A1 | 4/2007 | Hart et al. | |
| 2007/0083924 A1 | 4/2007 | Lu | |
| 2007/0086378 A1 | 4/2007 | Matta et al. | |
| 2007/0086397 A1 | 4/2007 | Taylor | |
| 2007/0086398 A1 | 4/2007 | Tiwari | |
| 2007/0091845 A1 | 4/2007 | Brideglall | |
| 2007/0091889 A1 | 4/2007 | Xiao et al. | |
| 2007/0098086 A1 | 5/2007 | Bhaskaran | |
| 2007/0104197 A1 | 5/2007 | King | |
| 2007/0106776 A1 | 5/2007 | Konno et al. | |
| 2007/0115842 A1 | 5/2007 | Matsuda et al. | |
| 2007/0133494 A1 | 6/2007 | Lai et al. | |
| 2007/0135159 A1 | 6/2007 | Sinivaara | |
| 2007/0135866 A1 | 6/2007 | Baker et al. | |
| 2007/0136372 A1 | 6/2007 | Proctor et al. | |
| 2007/0140163 A1* | 6/2007 | Meier et al. | 370/329 |
| 2007/0147318 A1* | 6/2007 | Ross et al. | 370/338 |
| 2007/0150945 A1 | 6/2007 | Whitaker et al. | |
| 2007/0160046 A1 | 7/2007 | Matta | |
| 2007/0171909 A1 | 7/2007 | Pignatelli | |
| 2007/0189222 A1 | 8/2007 | Kolar et al. | |
| 2007/0195793 A1 | 8/2007 | Grosser et al. | |
| 2007/0230457 A1 | 10/2007 | Kodera et al. | |
| 2007/0248009 A1 | 10/2007 | Petersen | |
| 2007/0253380 A1 | 11/2007 | Jollota et al. | |
| 2007/0255116 A1 | 11/2007 | Mehta et al. | |
| 2007/0258448 A1 | 11/2007 | Hu | |
| 2007/0260720 A1 | 11/2007 | Morain | |
| 2007/0268506 A1 | 11/2007 | Zeldin | |
| 2007/0268514 A1 | 11/2007 | Zeldin et al. | |
| 2007/0268515 A1 | 11/2007 | Freund et al. | |
| 2007/0268516 A1 | 11/2007 | Bugwadia et al. | |
| 2007/0286208 A1 | 12/2007 | Kanada et al. | |
| 2007/0287390 A1 | 12/2007 | Murphy et al. | |
| 2007/0291689 A1 | 12/2007 | Kapur et al. | |
| 2007/0297329 A1 | 12/2007 | Park et al. | |
| 2008/0002588 A1 | 1/2008 | McCaughan et al. | |
| 2008/0008117 A1 | 1/2008 | Alizadeh-Shabdiz | |
| 2008/0013481 A1 | 1/2008 | Simons et al. | |
| 2008/0014916 A1 | 1/2008 | Chen | |
| 2008/0031257 A1 | 2/2008 | He | |
| 2008/0056200 A1 | 3/2008 | Johnson | |
| 2008/0056211 A1 | 3/2008 | Kim et al. | |
| 2008/0064356 A1 | 3/2008 | Khayrallah | |
| 2008/0069018 A1 | 3/2008 | Gast | |
| 2008/0080441 A1 | 4/2008 | Park et al. | |
| 2008/0096575 A1 | 4/2008 | Aragon et al. | |
| 2008/0102815 A1 | 5/2008 | Sengupta et al. | |
| 2008/0107077 A1 | 5/2008 | Murphy | |
| 2008/0114784 A1 | 5/2008 | Murphy | |
| 2008/0117822 A1 | 5/2008 | Murphy et al. | |
| 2008/0130523 A1 | 6/2008 | Fridman et al. | |
| 2008/0151844 A1 | 6/2008 | Tiwari | |
| 2008/0159319 A1 | 7/2008 | Gast et al. | |
| 2008/0162921 A1 | 7/2008 | Chesnutt et al. | |
| 2008/0220772 A1 | 9/2008 | Islam et al. | |
| 2008/0226075 A1 | 9/2008 | Gast | |
| 2008/0228942 A1 | 9/2008 | Lor et al. | |
| 2008/0250496 A1 | 10/2008 | Namihira | |
| 2008/0261615 A1 | 10/2008 | Kalhan | |
| 2008/0276303 A1 | 11/2008 | Gast | |
| 2009/0028118 A1* | 1/2009 | Gray et al. | 370/338 |
| 2009/0031044 A1* | 1/2009 | Barrack et al. | 709/247 |
| 2009/0046688 A1 | 2/2009 | Volpi et al. | |
| 2009/0059930 A1 | 3/2009 | Ryan et al. | |
| 2009/0067436 A1 | 3/2009 | Gast | |
| 2009/0073905 A1 | 3/2009 | Gast | |
| 2009/0131082 A1 | 5/2009 | Gast | |
| 2009/0198999 A1 | 8/2009 | Harkins | |
| 2009/0247103 A1 | 10/2009 | Aragon | |
| 2009/0257437 A1 | 10/2009 | Tiwari | |
| 2009/0260083 A1 | 10/2009 | Szeto et al. | |
| 2009/0274060 A1 | 11/2009 | Taylor | |
| 2009/0287816 A1 | 11/2009 | Matta et al. | |
| 2009/0293106 A1 | 11/2009 | Peden, II et al. | |
| 2010/0002610 A1 | 1/2010 | Bowser et al. | |
| 2010/0024007 A1 | 1/2010 | Gast | |
| 2010/0040059 A1 | 2/2010 | Hu | |
| 2010/0067379 A1 | 3/2010 | Zhao et al. | |
| 2010/0142478 A1 | 6/2010 | Forssell et al. | |
| 2010/0172276 A1 | 7/2010 | Aragon | |
| 2010/0180016 A1 | 7/2010 | Bugwadia et al. | |
| 2010/0195549 A1 | 8/2010 | Aragon et al. | |
| 2010/0261475 A1 | 10/2010 | Kim et al. | |
| 2010/0329177 A1 | 12/2010 | Murphy et al. | |
| 2011/0128858 A1 | 6/2011 | Matta et al. | |
| 2011/0158122 A1 | 6/2011 | Murphy et al. | |
| 2011/0255466 A1 | 10/2011 | Gast et al. | |

FOREIGN PATENT DOCUMENTS

| | | |
|---|---|---|
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO94/03986 | 2/1994 |
| WO | WO99/11003 | 3/1999 |
| WO | WO 00/06271 A1 | 2/2000 |
| WO | WO 00/18148 | 3/2000 |
| WO | WO 02/089442 A1 | 11/2002 |
| WO | WO 03/085544 A1 | 10/2003 |
| WO | WO 2004/013986 A1 | 2/2004 |
| WO | WO 2004/095192 A2 | 11/2004 |
| WO | WO 2004/095800 A1 | 11/2004 |
| WO | WO 2006/014512 A2 | 2/2006 |

OTHER PUBLICATIONS

U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/495,134, filed Oct. 2007, Aragon et al.

(56) References Cited

OTHER PUBLICATIONS

U.S. Appl. No. 12/077,051, filed Mar. 2008, Gast, Mathew S.
Puttini, R., Percher, J., Me, L., and De Sousa, R. 2004. A fully distributed IDS for MANET. In *Proceedings of the Ninth international Symposium on Computers and Communications 2004 vol. 2 (Iscc"04)-vol. 02* (Jun. 28-Jul. 1, 2004). ISCC. IEEE Computer Society. Washington. DC. 331-338.
Puttini, R., Percher, J., Me, L., and De Sousa, R. 2004. A Fully Distributed IDS for Manet. In *Proceedings of the Ninth international Symposiun on Computers and Communications 2004 vol. 2 (Issc"04)-vol. 02* (Jun. 28-Jul. 1, 2004). ISCC. IEEE Computer Society, Washinaton. DC, 331-338.
Co-pending U.S. Appl. No. 10/778,901, filed Feb. 13, 2004.
Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,473, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/330,877, filed Jan. 11, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 12/491,201, filed Jun. 24, 2009.
Co-pending U.S. Appl. No. 11/417,830, filed May 3, 2006.
Co-pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 11/604,075, filed Nov. 22, 2006.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 11/975,134, filed Oct. 16, 2007.
Co-pending U.S. Appl. No. 11/966,912, filed Dec. 28, 2007.
Co-pending U.S. Appl. No. 12/131,028, filed May 3, 2008.
Co-pending U.S. Appl. No. 12/336,492, filed Dec. 16, 2008.
Notice of Allowance Mailed Feb. 26, 2007 in Co-pending U.S. Appl. No. 10/778,901, filed Feb. 13, 2004.
Non-Final Office Action Mailed Sep. 22, 2009 in Co-pending U.S. Appl. No. 11/784,307, filed Apr. 5, 2007.
Notice of Allowance Mailed Feb. 27, 2009 in Co-pending U.S. Appl. No. 11/377,859, filed Mar. 15, 2006.
Final Office Action Mailed Aug. 27, 2008 in Co-pending U.S. Appl. No. 11/377,859, filed Mar. 15, 2006.
Non-Final Office Action Mailed Jan. 8, 2008 in Co-pending U.S. Appl. No. 11/377,859, filed Mar. 15, 2006.
Notice of Allowance Mailed Jun. 11, 2009 in Co-pending U.S. Appl. No. 11/326,966, filed Jan. 5, 2006.
Non-Final Office Action Mailed Nov. 10, 2008 in Co-pending U.S. Appl. No. 11/326,966, filed Jan. 5, 2006.
Non-Final Office Action Mailed Dec. 2, 2009 in Co-pending U.S. Appl. No. 11/351,104, filed Feb. 8, 2006.
Final Office Action Mailed Jun. 10, 2009 in Co-pending U.S. Appl. No. 11/351,104, filed Feb. 8, 2006.
Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.
Final Office Action Mailed Oct. 23, 2008 in Co-pending U.S. Appl. No. 11/331,789, filed Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.
Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.
Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/592,891, filed Nov. 3, 2006.
Non-Final Office Action Mailed Jan. 14, 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
International Search Report PCT/US05/004702 dated Aug. 10, 2006, pp. 1-3.
Written Opinion PCT/US05/004702 dated Aug. 10, 2006, pp. 1-5.
International Search Report PCT/US06/09525 dated Sep. 13, 2007, pp. 1-2.
Written Opinion PCT/US06/09525 dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Search Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.
Written Opinion PCT/US07/089134 dated Apr. 10, 2008, pp. 1-4.
Notice of Allowance Mailed Mar. 19, 2010, in Co-pending U.S. Appl. No. 11/487,722, filed Jul. 17, 2006.
Notice of Allowance Mailed Feb. 23, 2010 in Co-pending U.S. Appl. No. 11/331,789 filed Jan. 14, 2006.
Puttini, R., Percher, J., Me, L., and de Sousa, R. 2004. A Fully Distributed IDS for MANET. In Proceedings of the Ninth international Symposium on computers and communications 2004 vol. 2 (Iscc"04)-vol. 02 (Jun. 28-Jul. 1, 2004). ISCC. IEEE Computer Society, Washington, DC, 331-338.
Co-pending U.S. Appl. No. 12/401,073, filed Mar. 10, 2009.
Co-pending U.S. Appl. No. 12/489,295, filed Jun. 22, 2009.
Final Office Action mailed Apr. 22, 2010, in Co-pending U.S. Appl. No. 11/330,877, filed Jan. 11, 2006.
Non-Final Office Action Mailed May 3, 2010, in Co-pending U.S. Appl. No. 12/763,057, filed Apr. 19, 2010.
Co-pending U.S. Appl. No. 12/763,057, filed Apr. 19, 2010.
Co-pending U.S. Appl. No. 12/785,362, filed May 21, 2010.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sem.uccalgary.ca~lawa/SENG60921/arch/SDP.htm> [retrieved Aug. 12, 2004] (15 pages).
P. Bahl et al., RADAR: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A Data Fusion Architecture for Enhanced Position Estimation in Wireless Networks," IEEE Communications Letters, vol. 5(8), Aug. 2001, p. 343-345.

(56) References Cited

OTHER PUBLICATIONS

Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pp.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless Lan Mobility System: Wireless LAN Switch and Controller Configuration Guide, 3COM, Revision A, Oct. 2004, 476 pages.
3COM, Wireless Lan Switch Manager (3WXM), 3COM, Revision C, Oct. 2004, 8 pages.
3COM, Wireless Lan Switch and Controller; Quick Start Guide, 3COM, Revision B, Nov. 2004, 10 pages.
3COM, Wireless Lan Mobility System; Wireless LAN Switch and Controller Installation and Basic Configuration Guide, Revision B, Apr. 2005, 496 pages.
Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarchpapers/dsr-chapter00.pdf).
Information Sciences Institute, RFC-791—Internet Protocol, DARPA, Sep. 1981.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 09/866,474, filed May 29, 2001.
U.S. Appl. No. 13/017,801, filed Jan. 31, 2011.
Final Office Action for U.S. Appl. No. 11/784,307, mailed Jun. 14, 2010.
Office Action for U.S. Appl No. 12/401,073, mailed Aug. 23, 2010.
Final Office Action for U.S. Appl No. 12/401,073, mailed Apr. 1, 2011.
Office Action for U.S. Appl. No. 12/401,073, mailed Sep. 20, 2011.
Office Action for U.S. Appl. No. 12/500,392, mailed Jun. 20, 2011.
Office Action for U.S. Appl. No. 12/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 12/785,362, mailed Apr. 22, 2011.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Final Office Action for U.S. Appl. No. 12/077,051, mailed Oct. 25, 2011.
Office Action for U.S. Appl. No. 12/113,535, mailed Apr. 21, 2011.
Final Office Action for U.S. Appl. No. 12/113,535, mailed Jan. 3, 2012.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/210,917, mailed Dec. 5, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US2006/009525, mailed Sep. 13, 2007.

(56) References Cited

OTHER PUBLICATIONS

International Search Report and Written Opinion for PCT/US06/40500, mailed Aug. 17, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.
U.S. Patent Application No. 13/437,669, filed Apr. 2, 2012.
U.S. Patent Application No. 13/437,673, filed Apr. 2, 2012.
Final Office Action for U.S. Appl. No. 12/489,295, mailed Jan. 18, 2012.
Office Action for U.S. Appl. No. 12/370,562, mailed Jan. 17, 2012.
Office Action for U.S. Appl. No. 12/683,281, mailed Jan. 20, 2012.
Final Office Action for U.S. Appl. No. 12/304,100, mailed Feb. 2, 2012.
Office Action for U.S. Appl. No. 12/113,535, mailed Apr. 20, 2012.
Final Office Action for U.S. Appl. No. 11/852,234, mailed Jan. 20, 2012.
Final Office Action for U.S. Appl. No. 12/350,927 mailed Jan. 18, 2012.
Second Office Action for Chinese Application No 200780029623.X, mailed Mar. 7, 2012.
Extended Supplementary European Search Report for Application No. 07796005.2, mailed Feb. 14, 2012.
U.S. Appl. No. 11/326,966, filed Jan. 5, 2006, Taylor.
U.S. Appl. No. 11/330,877, filed Jan. 11, 2006, Matta.
U.S. Appl. No. 11/331,789, filed Jan. 14, 2006, Matta, et al.
U.S. Appl. No. 11/377,859, filed Mar. 15, 2006, Harkins.
U.S. Appl. No. 11/400,165, filed Apr. 5, 2006, Tiwari.
U.S. Appl. No. 11/445,750, filed May 3, 2006, Matta.
U.S. Appl. No. 11/417,830, filed May 30, 2006, Morain.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19, 2006, Zeldin.
U.S. Appl. No. 11/437,387, filed May 19, 2006, Zeldin et al.
U.S. Appl. No. 11/437,582, filed May 19, 2006, Bugwadia et al.
U.S. Appl. No. 11/451,704, filed Jun. 12, 2006, Riley.
Acampora and Winters, IEEE Communications Magazine, 25 (8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.

\* cited by examiner

SYSTEM AND METHOD FOR NETWORK INTEGRITY

CROSS REFERENCE TO RELATED APPLICATIONS

This Application claims the benefit of U.S. Provisional Application No. 60/727,025 filed on Oct. 13, 2005, which is incorporated by reference.

BACKGROUND

Wireless technology provides a mechanism for either replacing or extending traditional wired networks including, but not limited to, local area networks, personal area networks, and metropolitan area networks among others. Using radio frequency or non-radio frequency technology, wireless networks transmit and receive data over the air, through walls, ceilings and even cement structures without wired cabling.

A wireless network allows a mobile user to connect a local area network through a wireless connection according to a wireless protocol. Wireless protocols include, but are not limited to, IEEE 802.11a, 802.11b, 802.11c, 802.11g, Hiper-Lan 2, or any other protocol for any point-to-point wireless link or network. These wireless protocols are designed to provide high bandwidth allocation while offering flexibility.

Unfortunately, wireless networks are particularly susceptible to unauthorized intrusion and malicious attacks due to the public nature of the radio bands used in enterprise networks. While some intruders are searching for free Internet access, others are intent on gaining access to an enterprise network for malicious purposes. These malicious purposes range from stealing and damaging data to disrupting legitimate communication.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for improving wireless network integrity involves maintaining a forwarding database that can be used to identify devices on the network. An example of a system according to the technique includes a wired network, a switch, a wireless access point and a forwarding database. The switch can be coupled to the wired network and the wireless access point can be coupled to the switch. The forwarding database can include a medium access control (mac) address for each device seen by the switch on the wired network. In operation, identifying information of an unknown device can be detected by the wireless access point. The identifying information can be compared with the mac addresses in the forwarding database. If the identifying information matches a mac address in the forwarding database, the unknown device can be classified as rogue and countermeasures can be taken against the rogue device.

In alternate embodiments, the unknown device can be an unknown access point or an unknown client. Further, the identifying information collected by the wireless access point can be stored in a collated database located on the switch. In other embodiments, the collated database can be created by the wireless access point operating in promiscuous mode. The forwarding database can also be stored on the switch.

The system can further include an SSID database. An SSID of the unknown device can be detected by the wireless access point. The SSID of the unknown device can be compared with the SSID database. If a match exists, countermeasures can be taken against the unknown device. In another embodiment, a fingerprint can be inserted into packets sent by legitimate devices. If packets from the unknown device do not contain the fingerprint, but the source mac address matches that of one of the infrastructure access points, countermeasures can be taken against the unknown device.

An example of a method according to the technique involves detecting identifying information of a device. The identifying information can be checked to determine whether the identifying information matches wired network information. If a match exists, the device can be classified as rogue and/or countermeasures can be performed against the device.

In alternate embodiments, checking can involve comparing the identifying information of the device to mac addresses of devices seen on the wired network. In other embodiments, the method can further include inserting a fingerprint into packets sent by a legitimate device.

An exemplary switch can include a port, a processor, and memory. The memory may or may not include a forwarding database and a counter measure module. The port can be capable of connecting to a wired network. The processor can be capable of processing network information. The forwarding database can include a mac address for each device seen by the switch on the wired network. In operation, identifying information of an unknown device can be detected and compared with the forwarding database. If a match exists, the unknown device can be classified as rogue and countermeasures can be taken against the rogue device.

In additional embodiments, the identifying information can be detected by a wireless access point. Further, the identifying information can be stored in a collated database on the switch. The collated database can include an access point database and a client database which are created by the wireless access point operating in promiscuous mode. The switch can also be capable of sharing the forwarding database with other switches on the wired network. The countermeasures module can be capable of sending deauthenticate packets or disassociate packets to the rogue device in response to an attack.

The proposed system, method and device can offer, among other advantages, improved network integrity. This can be accomplished in an efficient and robust manner compared to other networks. Advantageously, the proposed system, method and device can identify and perform countermeasures against a variety of attacks, including, for example, wired network attacks, wireless network attacks, spoofing attacks, mac address masquerades and SSID masquerades. These and other advantages of the present invention will become apparent to those skilled in the art upon a reading of the following descriptions and a study of the several figures of the drawings.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
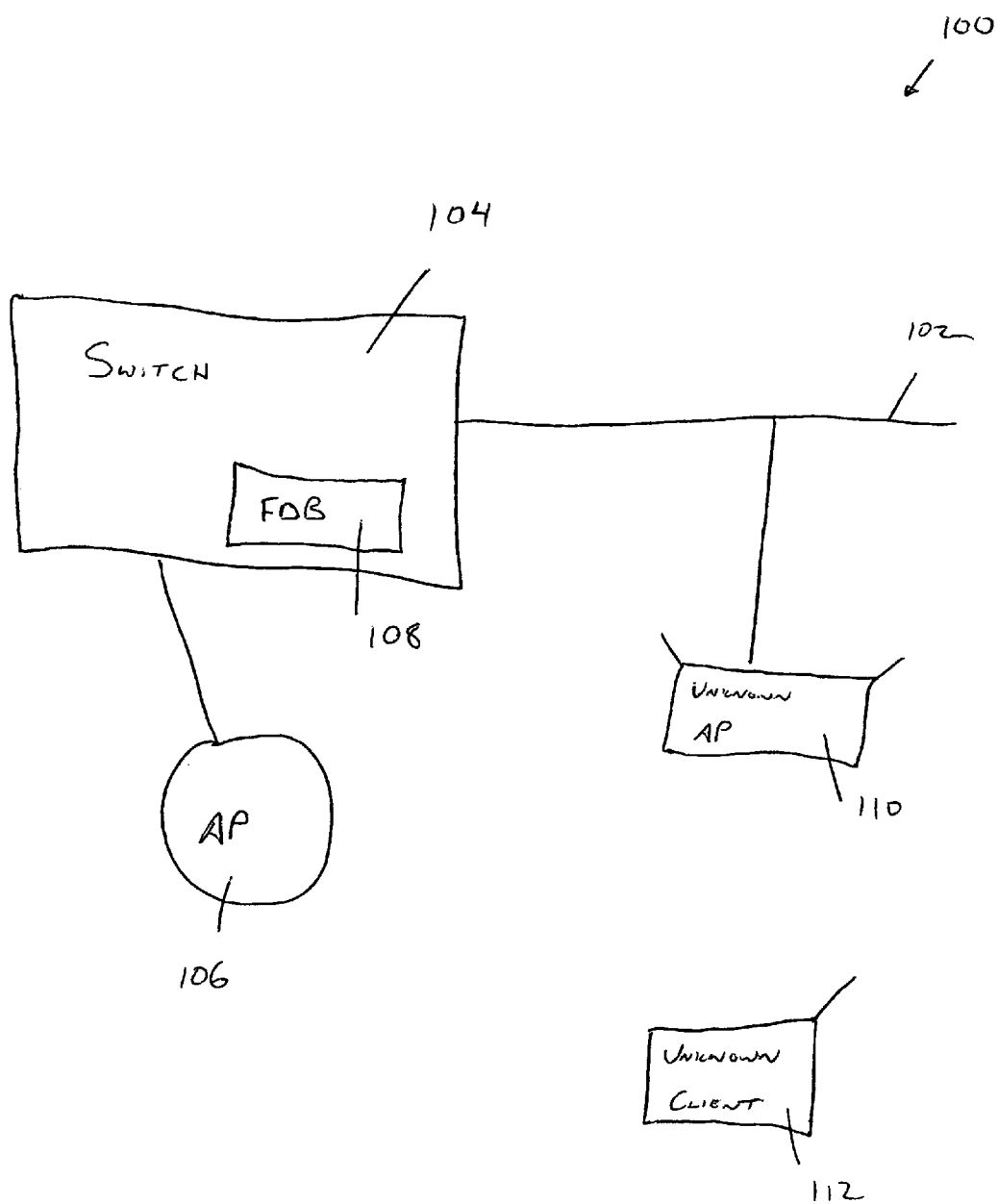
FIG. 1 depicts an example of a system having components that may improve network integrity.

FIG. 1 depicts an example of a system 100 having components that may improve network integrity. In the example of FIG. 1, the system 100 includes a wired network 102, a switch 104, and an access point 106. In the example of FIG. 1, the switch 104 includes a forwarding database 108. The switch 104 is coupled to the wired network 102 and the access point 106 is coupled to the switch 104. In an embodiment, the switch 104 is connected to the wired network 102 via a wired connection, and the access point 106 is connected to the switch 104 via a wired connection. In alternate embodiments, one or both of these connections could be wireless. The forwarding database 108 may include mac addresses of devices connected to the wired network 102. The forwarding database 108 can be populated by analyzing each device coupled to each port of the switch 104. If a device is coupled to the switch 104, the device's mac address is automatically entered into the forwarding database 108. In another embodiment, the mac address of a device can be manually inputted into the forwarding database 108.

For illustrative purposes only, an unknown access point 110 is coupled to the wired network 102 and an unknown client 112 is wirelessly coupled to the unknown access point 110. Because the unknown access point 110 is coupled to the wired network 102, the mac address of the unknown access point 110 is located in the forwarding database 108.

In operation, the access point 106 detects packets sent from the unknown access point 110 to the unknown client 112. The packets presumably contain identifying information such as, for example, the mac address of the unknown access point 110. To, for example, determine whether the unknown access point 110 is a threat to the wired network 102, the access point 106 relays the identifying information to the switch 104 which performs a lookup in the forwarding database 108. If the mac address of the unknown access point 110 is in the forwarding database 108, the unknown access point 110 is connected to the wired network 102. An unknown access point connected to the wired network is typically considered a threat to the wired network. Therefore, in an embodiment, if the mac address of the unknown access point 110 is in the forwarding database 108, the unknown access point 110 is classified as a threat to the wired network 102. As such, countermeasures can be initiated against the unknown access point 110 and unknown client 112.

In other embodiments, the components of the system 100 and arrangement thereof can vary greatly. For example, the forwarding database 108 can be coupled to the system 100 in any convenient and/or known manner, including, by way of example, being on an access point, a client, another switch, a router, or any other device capable of storing a database and/or communicating over a network, locally or remotely.

In additional embodiments, the access point 106 can detect identifying information from unknown devices using any convenient and/or known technique, including, for example, active scan, promiscuous mode, or any other convenient and/or known scanning technique. For example, an access point operating in active scan can cycle through channels 1-14 of the 802.11 standard. An access point operating in promiscuous mode can sniff for all packets transmitted on a particular channel. In certain embodiments utilizing both active scan and promiscuous mode, the access point can go off channel for 30 milliseconds per second, or any other desired time interval, and sniff for packets to detect identifying information. The identifying information can include any wired and/or wireless network information including, but not limited to, a device mac address, source mac address, destination mac address, client mac address, SSID, BSSID, fingerprint and digital signature.

One or more radios can be coupled to the access point 106. In other embodiments, the radios can operate, by way of example but not limitation, in the 2.4 Ghz range (802.11 11b/11g) and/or the 5.0 GHz range (802.11 11a). In other embodiments, additional access points can be added and/or removed from the switch 104, additional switches can be added and/or removed from the wired network, additional unknown devices can be detected by the system, and additional databases can be added and/or removed from the system.

Figure 2:
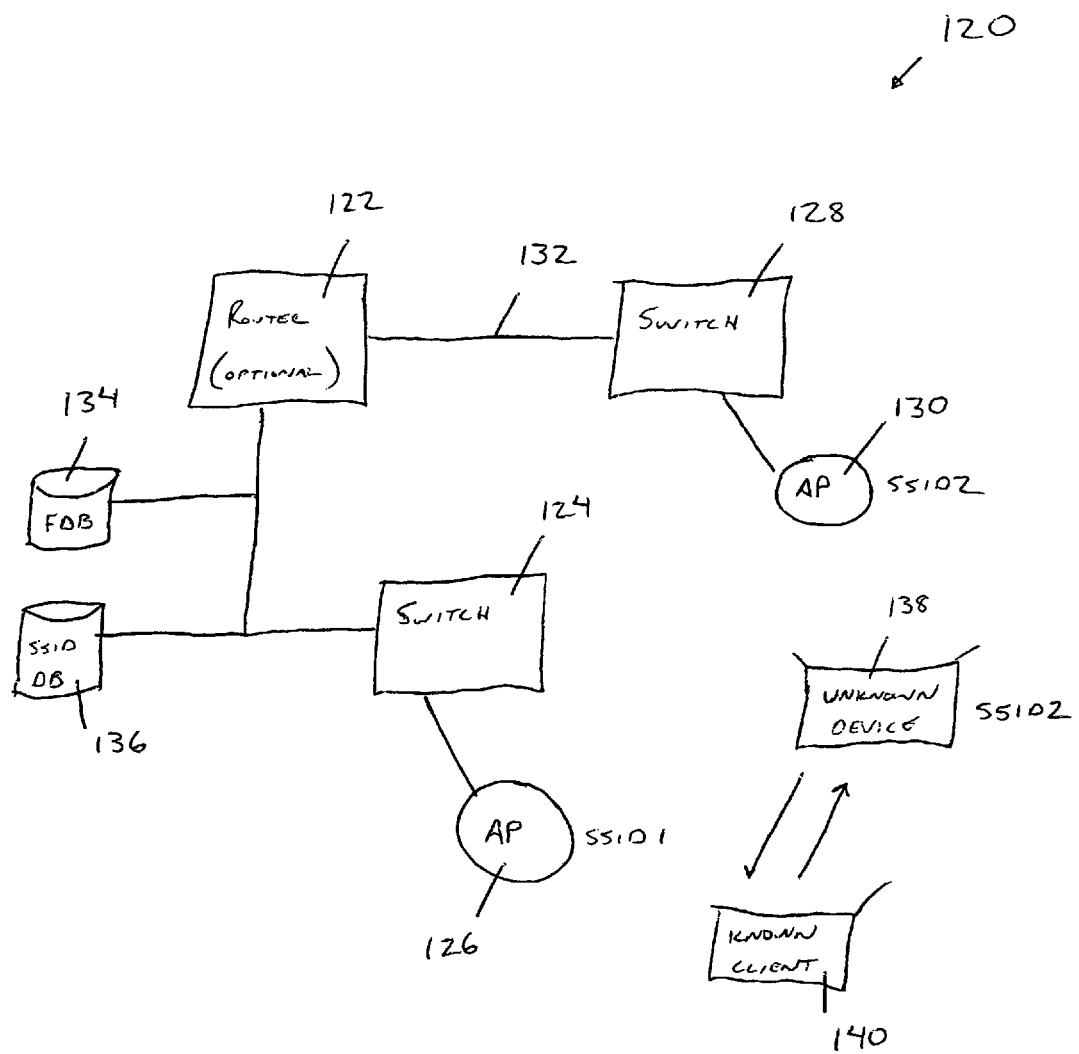
FIG. 2 depicts an example of a system having components that may facilitate detection of an SSID masquerade.

FIG. 2 depicts an example of a system 120 having components that may facilitate detection of an SSID masquerade. In the example of FIG. 2, the system 120 further includes an optional router 122, a first switch 124, a first access point 126, a second switch 128, a second access point 130 and a wired network 132. In the example of FIG. 2, the system 120 includes a forwarding database 134 and an SSID database 136. In an embodiment, the router 122, first switch 124, and second switch 128 are connected to the wired network 132 via wired connections. The first access point 126 is coupled to the first switch 124 via a wired connection and the second access point 130 is coupled to the second switch 128 via a wired connection. The first switch 124 and the second switch 128 are both coupled to the router 122 via wired connections. The forwarding database 134 and the SSID database 136 are also connected to the system 120 via wired connections. In alternate embodiments, one, some, or all of the wired connections could be wireless. The SSID database 136 contains an SSID of all legitimate devices coupled to the wired network 132.

In the example of FIG. 2, an unknown device 138 is assumed for illustrative purposes to be attacking the system 120 by performing an SSID masquerade. Specifically, the unknown device 138 is using the same SSID as the second access point 130. Because the SSIDs are the same, a known client 140 may send packets to the unknown device 138 instead of the second access point 130. In this way, the unknown device 138 may be able to capture packets, and potentially comprise network security.

In the example of FIG. 2, the system 120 is capable of discovering and disabling an SSID attack. Initially, the first access point 126 detects packets sent from/to the known client 140 to/from the unknown device 138. The packets presumably include identifying information including the SSID of the unknown device 138. The identifying information of the unknown device 138 can include, by way of example but not limitation, the mac address of the unknown device 138.

To determine whether the unknown device 138 is performing an SSID masquerade, the first access point 126 relays the identifying information including the SSID to the first switch 124 which performs a lookup in the SSID database 136. The SSID database 136 contains the SSIDs of all known, legitimate devices. The switches can share the SSIDs of the access points to populate an SSID database of all legitimate devices. Typically, the SSID database is located on each switch and contains the SSID of each access point connected to the switch. Since the access point is connected to the switch the mac address of each access point is associated with the SSID of the access point. Thus, if the SSID of the unknown device 138 matches an SSID in the SSID database, and the mac address of the unknown device is not recognized, it can be surmised that the unknown device 138 is masquerading the SSID of a legitimate device. Assuming the SSID of the unknown device matches the SSID of the access point 130, countermeasures can be initiated against the unknown device 138.

In other embodiments, the components of the system 120 and arrangements thereof can vary greatly. For example, the SSID database can be coupled to the system in any convenient and/or known manner, including, by way of example, being on the access point, a client, a switch, a router, or any other device capable of storing a database and/or communicating over a network, locally or remotely.

Figure 3:
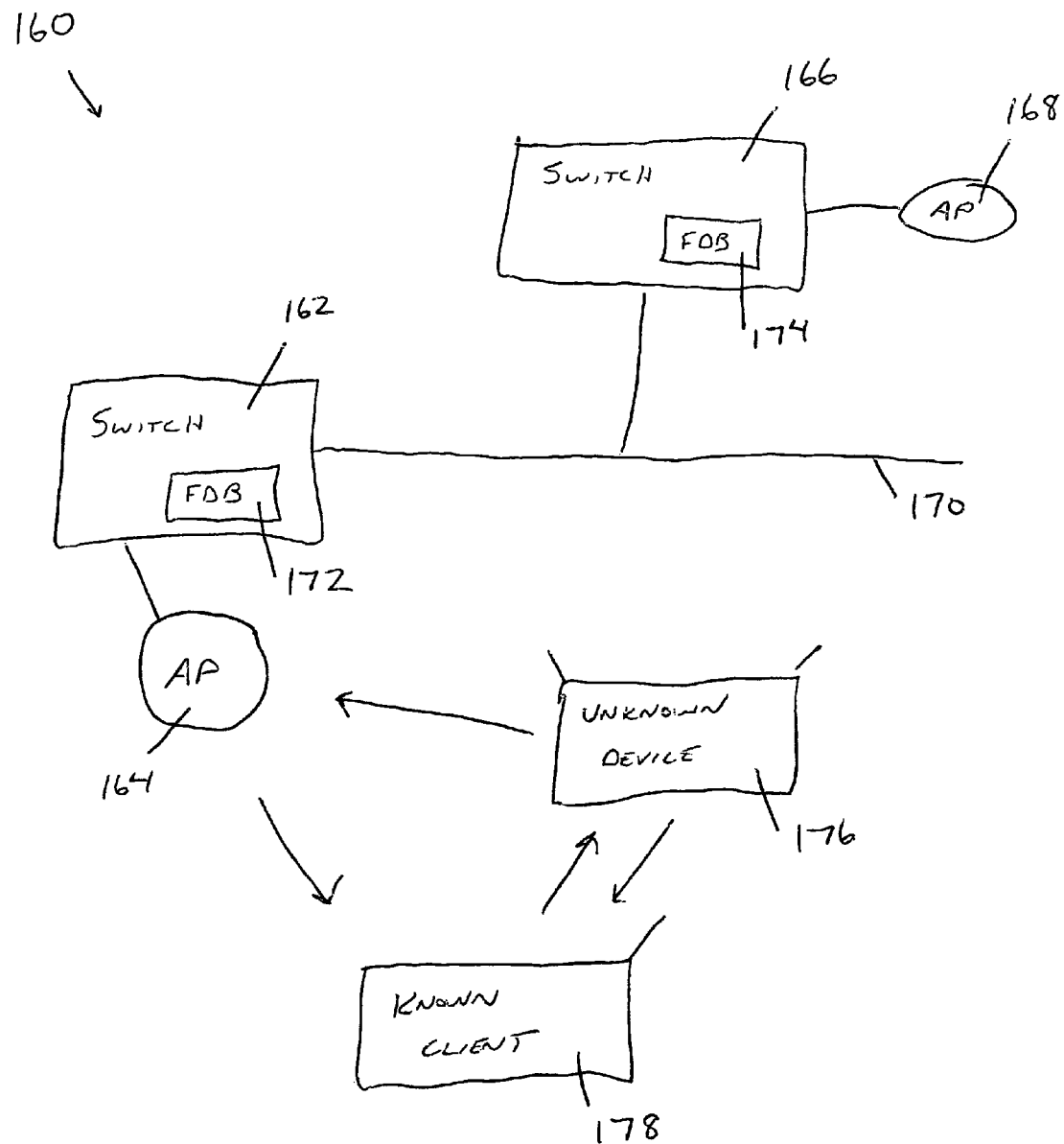
FIG. 3 depicts an example of a system having components that may facilitate detection of a mac masquerade.

FIG. 3 depicts an example of a system 160 having components that may facilitate detection of a spoofing attack or a mac masquerade. In the example of FIG. 3, the system 160 includes a member switch 162, a first access point 164, a seed switch 166, a second access point 168, and a wired network 170. In the example of FIG. 3, the member switch 162 includes a first forwarding database 172 and the seed switch 166 includes a second forwarding database 174. In an embodiment, the member switch 162 and the seed switch 166 are coupled to the wired network 170 via wired connections and the first access point 164 and the second access point 168 are coupled respectively to the first switch 162 and the second switch 166 via a wired connection. In alternative embodiments, one, some, or all of these connections could be wireless.

In the example of FIG. 3, for illustrative purpose only, an unknown device 176 is attacking the system 160 by performing a spoofing attack or a mac masquerade. Specifically, the unknown device 176 is using the same mac address as the first access point 164. In one embodiment, the source mac address may be spoofed so that the known client 178 thinks that the packets are coming from the first access point 164. In other embodiments, the unknown device 176 may be trying to masquerade the mac address of the first access point 164 causing the known client 178 to send packets to the unknown device 176. In either example, because the mac addresses of the unknown device 176 is the same as first access point 164, a known client 178 is sending/receiving packets to/from the unknown device 176 instead of the first access point 164. In this way, the unknown device 176 may be able to capture/send packets, and potentially compromise network integrity.

In the example of FIG. 3, the system 160 is capable of discovering and disabling a spoofing attack or mac masquerade. Initially, the seed switch 166 generates a pseudo-random number which can serve as a fingerprint. The fingerprint can be, by way of example but not limitation, a 32-bit pseudo-random number. In other embodiments, the fingerprint may be any known and/or convenient mechanism for identifying packets. The seed switch 166 sends the fingerprint to the member switch 162 over the wired network 170. In alternative embodiments where more than one member exists, a seed switch can send the fingerprint to all member switches in the mobility domain. The seed switch can also change and resend the fingerprint to all members after a predetermined period of time. For example, the seed switch can change the fingerprint every ten minutes.

Once a fingerprint is generated and transmitted, the seed switch 166 configures the second access point 168 to include the fingerprint in, for example, the management and/or beacon frames transmitted by the second access point 168. The member switch 164 configures the first access point 164 to include the fingerprint in the management and/or beacon frames transmitted by the first access point. In alternative embodiments, all members in the mobility domain configure all connected access points to include the fingerprint in the management and/or beacon frames transmitted by the access points. In other embodiments, the fingerprint can be inserted into any of the packets, or any subset of the packets, transmitted by the access points.

The seed switch can have a forwarding database, a collated database, an access point database, a client database, and/or any other convenient and/or known database capable of storing wired and/or wireless information. Further, a seed and/or member can have any number of access points coupled thereto.

In operation, the second access point 168 detects packets sent from/to the known client 178 and to/from the unknown device 176, including the management and/or beacon frames. The second access point 168 relays the packets to the second switch 166. The second switch 166 determines whether the packets sent to/from the unknown device 176 contain the fingerprint that the access points were configured to transmit. If the packets from the unknown device 176 do not contain the fingerprint, the unknown device is presumably not legitimate and countermeasures can be initiated against the unknown device 176.

Figure 4:
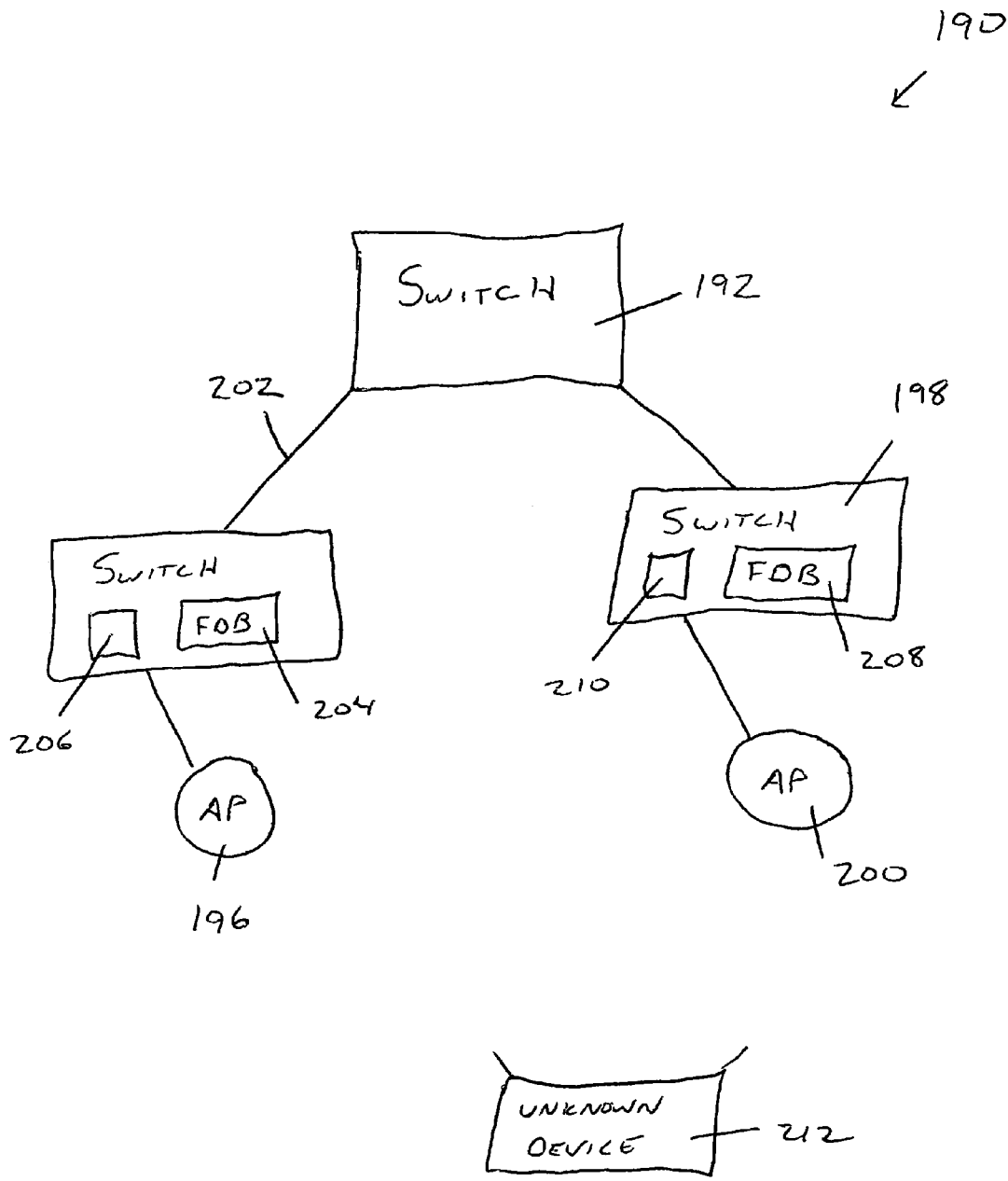
FIG. 4 depicts an example of a system having components that may facilitate detection and prevent attacks.

FIG. 4 depicts an example of a system 190 having components that may facilitate the detection and prevention of attacks. In the example of FIG. 4, the system 190 includes a seed switch 192, a first member switch 194, a first access point 196, a second member switch 198, a second access point 200 and a wired network 202. The system 190 may be referred to as a mobility-domain as a mobility domain typically includes a plurality of switches that share information among themselves. In the example of FIG. 4, the first member switch 194 includes a first forwarding database 204 and a first collated database 206 and the second member switch 198 includes a second forwarding database 208 and a second collated database 210. In an embodiment, the seed switch 192, the first member switch 194 and the second member switch 198 are connected to the wired network 202 via wired connections. Further, the first access point 196 and the second access point 200 are respectively coupled to the first switch 194 and the second switch 198 via a wired connection. In alternative embodiments, one, some, or all of these connections could be wireless.

The collated databases 206, 210 can be coupled to the system 190 in any convenient and/or known manner, including by way of example, being on a switch, an access point, a client, or any other device capable of storing a database and/or communicating over a network. The collated databases 206, 210 can be created by the access point and/or any other convenient and/or known device capable of creating a collated database. In certain embodiments, the collated databases 206, 210 can include an access point database, a client database, and/or any other database of wired and/or wireless network information.

In operation, the first access point 196 detects packets sent from/to an unknown device 212. The first access point 196 relays the identifying information to the first switch 194. The first switch 194 performs a lookup in the first forwarding database 204 and sends a message to the seed switch 192 to determine whether the identifying information is in any other switch's forwarding database. The seed switch 192 then performs a lookup in the second forwarding database 208 which is relayed to the seed switch 192 by the second switch 198. The seed switch 192 then sends a response to the first switch 194 indicating that the identifying information of the unknown device 212 does not match any entries in the second forwarding database 208. The forwarding databases 204, 208 presumably contain the mac addresses of all devices connected to the wired network 202. Since the forwarding databases 204, 208 do not contain the mac address of the unknown device 212, it may be surmised that the unknown device 212 is not connected to the wired network 202. By doing a lookup in the forwarding database of all switches in the mobility-domain and using the result of that lookup along with the information collected by all APs in the mobility-domain, it may be determined which device may be a threat.

In other embodiments, any number of switches can be coupled to the wired network to form a mobility domain. Also, any number of the switches can be designated as seeds, members and/or any other convenient and/or known designation capable of facilitating a mobility domain and/or enterprise network. Each access point can be capable of operating in active scan, promiscuous mode, or any other convenient and/or known scanning technique.

Figure 5:
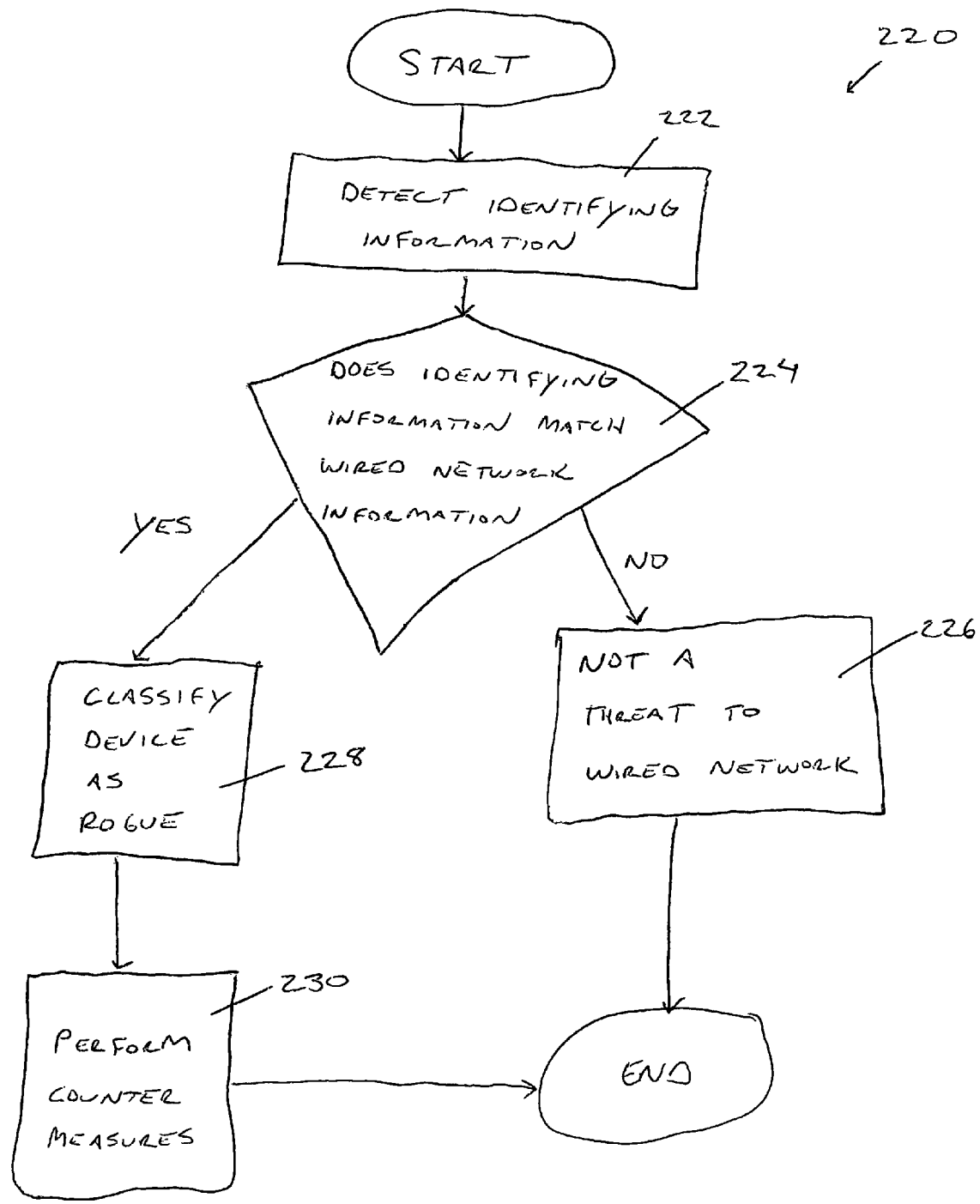
FIG. 5 depicts a flowchart of an example of a method for classifying an unknown device.

FIG. 5 depicts a flowchart 220 of an example of a method for classifying an unknown device and performing countermeasures. FIG. 5 is intended to illustrate detecting and classifying an unknown device. In the example of FIG. 5, the flowchart 220 starts at module 222 where identifying information of an unknown device is detected. Identifying information can be detected using a variety of techniques including active scan, promiscuous mode or any other convenient and/or known identifying technique. In one example, detecting identifying information can involve sniffing packets from/to the unknown device to determine a mac address, client mac address, and/or a destination mac address.

In the example of FIG. 5, the flowchart 220 continues at decision point 224 where it is determined whether identifying information matches wired network information. In one example, the switch can determine whether the mac address, client mac address, and/or destination mac address matches a mac address in the forwarding database. If the identifying information does not match wired network information (224-No), then at module 226 the unknown device may not be considered a threat to the wired network. If the identifying information does match wired network information (224-Yes), then the flowchart 220 continues at module 228 where the device is classified as rogue and at module 230 where countermeasures are performed against the rogue device. The countermeasures can include any convenient and/or known technique capable of disrupting a wired or wireless device connected to the network, including, but not limited to, a denial of service countermeasure involving sending disassociate and/or deauthenticate packets to the unknown device.

Figure 6:
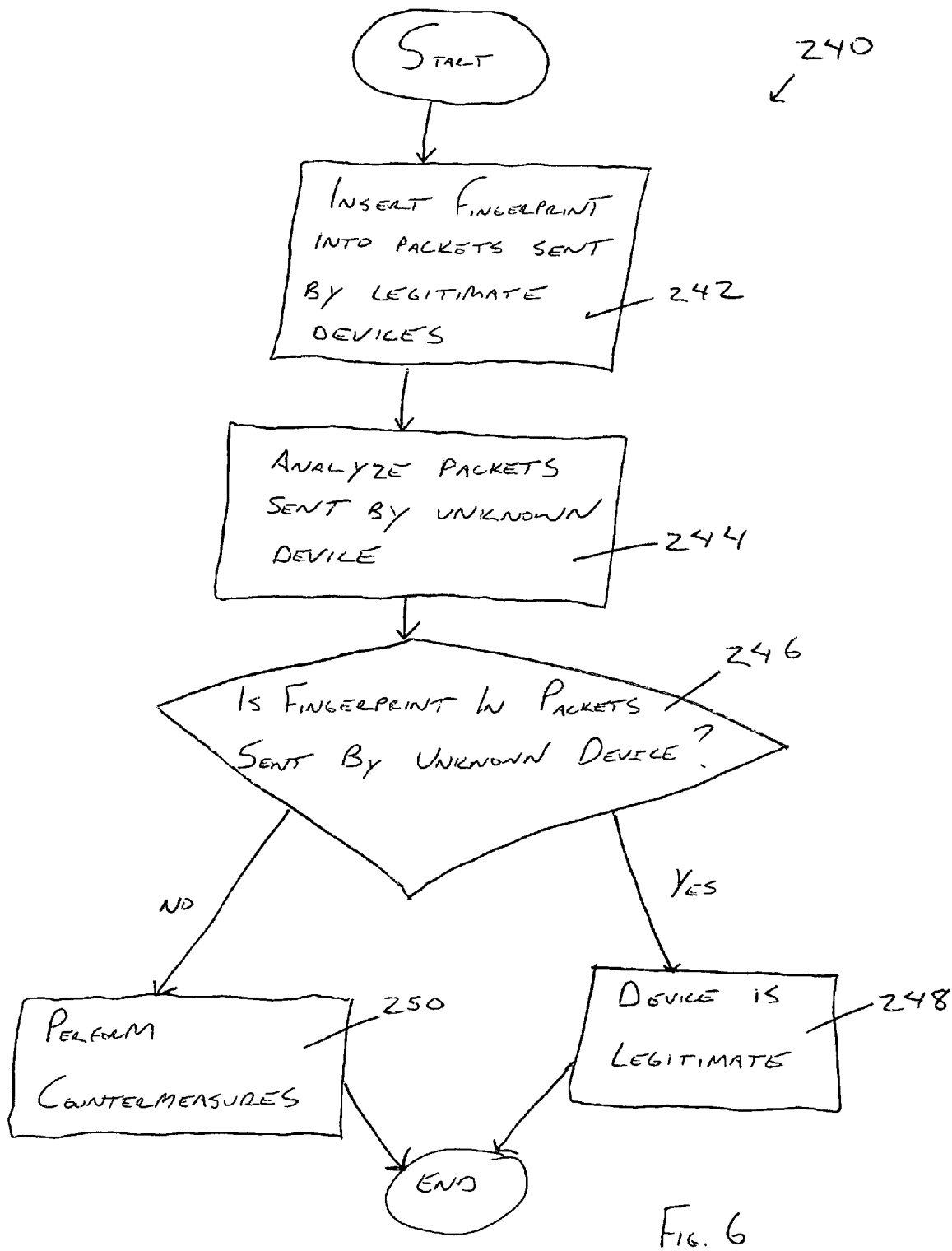
FIG. 6 depicts a flowchart of an example of a method for detecting a mac address masquerade.

FIG. 6 depicts a flowchart 240 of an example of a method for detecting a mac address masquerade attack. FIG. 6 is intended to illustrate including a fingerprint in packets sent by legitimate devices and checking for the fingerprint in packets sent by an unknown device to determine whether the device is legitimate. In the example of FIG. 6, the flowchart 240 starts at module 242 where a fingerprint is included in packets sent by legitimate devices. The fingerprint can be included by any component connected to the enterprise network, including, but not limited to, an access point, a seed switch, a member switch, or any other convenient and/or known device that is connected to the wired network and is capable including a fingerprint into packets sent by legitimate devices.

In the example of FIG. 6, the flowchart 240 continues at module 244 where packets sent by the unknown device are analyzed. Analysis can include parsing the packets to determine the fingerprint, comparing sniffed packets to legitimate packets, or any other convenient and/or known technique that can be used to analyze packets for a fingerprint.

In the example of FIG. 6, the flowchart 240 continues at decision point 246 where it is determined whether the fingerprint is in packets sent by the unknown device. If the fingerprint is in the packets sent by the unknown device (246-Yes), then the flowchart 240 continues at module 248 where the unknown device is classified as legitimate. If the fingerprint is not in packets sent by the unknown device (246-No), then the flowchart continues at module 250 where countermeasures are performed against the unknown device. The countermeasures can include any convenient and/or known technique capable of disrupting a wired or wireless device connected to the network, including, but not limited to, a denial of service countermeasure involving sending disassociate and/or deauthenticate packets to the unknown device.

Figure 7:
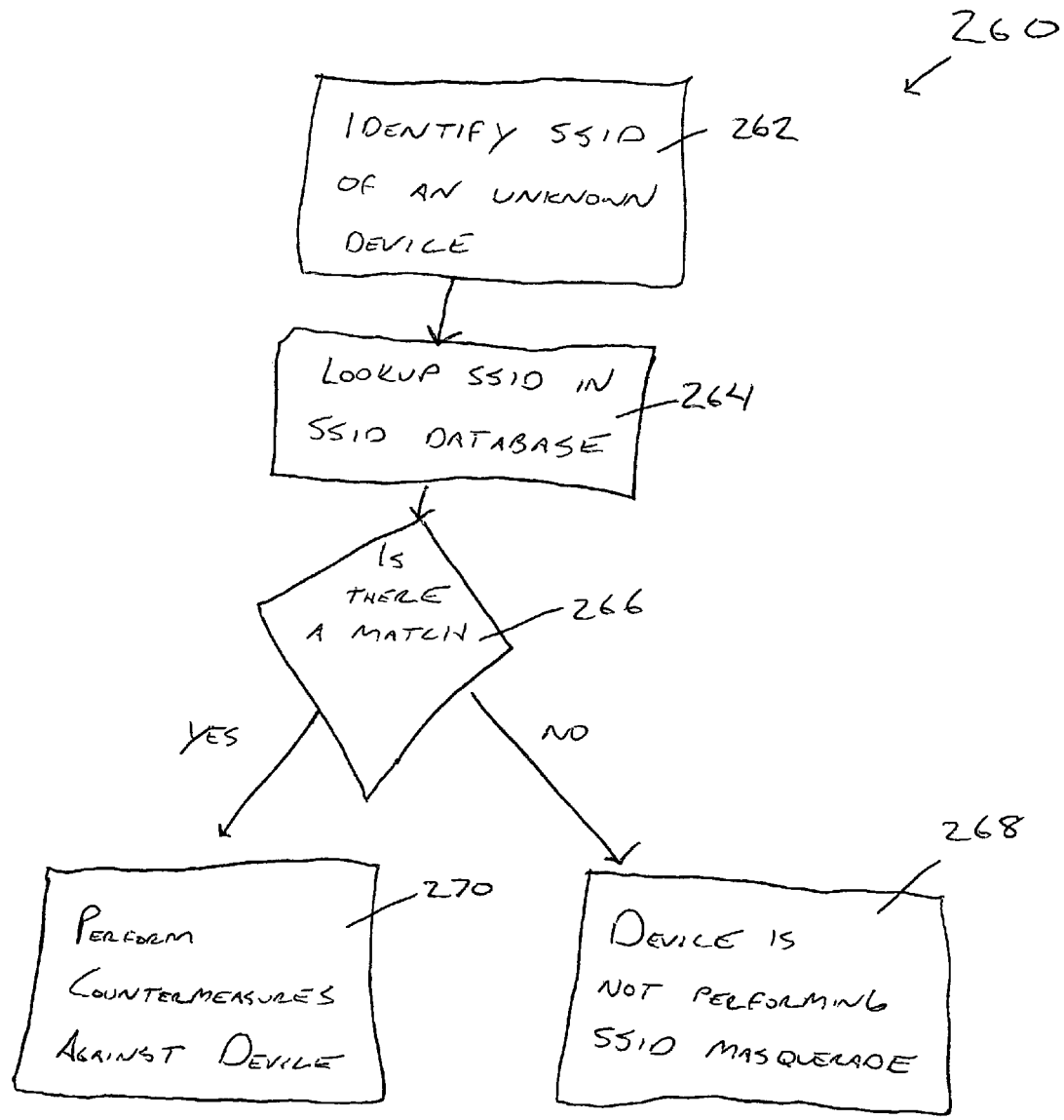
FIG. 7 depicts a flowchart of an example of a method for detecting an SSID masquerade.

FIG. 7 depicts a flowchart 260 of an example of a method for detecting a SSID masquerade attack. FIG. 7 is intended to illustrate identifying an SSID of an unknown device and determining whether the device is legitimate. In the example of FIG. 7, the flowchart 260 starts at module 262 where an SSID of an unknown device is identified. The SSID of the unknown device can be identified using any convenient and/or known technique, including, but not limited to, sniffing packets from/to the device and analyzing the SSID associated with the packets.

In the example of FIG. 7, the flowchart 260 continues at module 264 where a lookup is performed in an SSID database. The SSID database can be located on any device including, but not limited to, a switch (seed or member), access point, or any other convenient and/or known memory device capable of communicating on a network.

In the example of FIG. 7, the flowchart 260 continues at decision point 266 where it is determined whether the SSID of the unknown device matches an SSID in the database. If no match exits (266-No), then module 268 classifies the device as not performing an SSID masquerade. If a match exits (266-Yes), then module 270 performs countermeasures against the device. The countermeasures can include any convenient and/or known technique capable of disrupting a wired or wireless device connected to the network, including, but not limited to, sending disassociate and/or deauthenticate packets to the unknown device.

Figure 8:
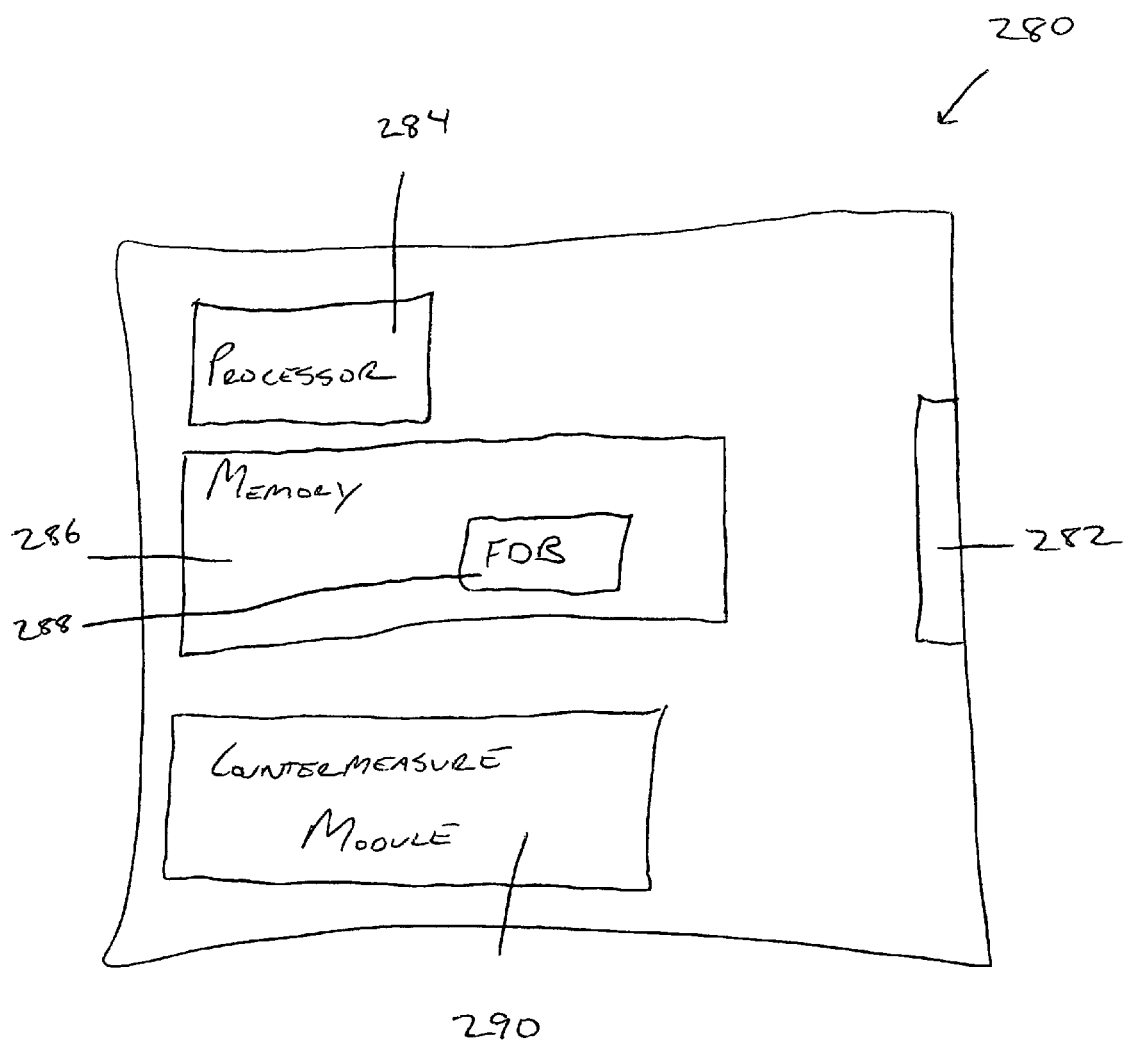
FIG. 8 depicts an example of a switch.

FIG. 8 depicts an example of a switch 280. The switch 280 includes a port 282, a processor 284, a memory 286, a forwarding database 288, and a countermeasure module 290. In the example of FIG. 8, the port 282 is capable of being coupled to a wired network. In other examples, the port can be capable of being coupled to any convenient and/or known network, including, but not limited to a local area network, power line communication network, metropolitan area network, wide area network, personal network, storage area network, server farm, process control network, value added network, SOHO network, Wi-Fi wireless network, or XML appliance network. The processor 284 can be capable of processing network information, which can include for example, access point information, client information, wireless network information, wired network information, SSID information, fingerprint information, and/or any other information capable of being transmitted over a network. In the example of FIG. 8, the forwarding database is stored in the memory 286. In other examples, a collated database can be also be stored in the memory, where the collated database includes an access point database and a client database. In addition examples, the memory 286 can be any convenient and/or known data storage device, including but not limited to, DRAM, EPROM, EEPROM, flash memory, NVRAM, MRAM, RAM, ROM, SRAM, VRAM, or WRAM, which can be removable, nonremovable, volatile and/or nonvolatile. The countermeasure module, in the example of FIG. 8, can be capable of disrupting a wired or wireless device connected to the network utilizing any known and/or convenient countermeasures, including, but not limited to, sending disassociate and/or deauthenticate packets to an unknown device.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system, comprising:
   an access point configured to be coupled to (1) a network associated with a fingerprint unique to the network and (2) a forwarding database storing an identifier for a first device coupled to the network, the fingerprint having a value other than an identifier for the network and the value of the fingerprint being changed after a period of time;
   the access point configured to detect an identifier of a second device within a packet forwarded on the network;
   the access point configured to compare the identifier of the second device with the identifier of the first device stored in the forwarding database; and
   the access point configured to classify the second device as a rogue device when (1) the identifier of the second device matches the identifier of the first device stored in the forwarding database and (2) the packet does not include the fingerprint.

2. A system as recited in claim 1, wherein the access point is a first access point and the second device is a second access point.

3. A system as recited in claim 1, wherein the access point configured to (1) operate in a promiscuous mode and (2) define a collated database.

4. A system as recited in claim 1, wherein the forwarding database is stored on a switch coupled to the network.

5. A system as recited in claim 1, wherein the identifier of the second device is one of a MAC address or an SSID.

6. A system as recited in claim 5, wherein the second device is performing an SSID masquerade.

7. A system as recited in claim 1 wherein the access point is a first access point, the system further comprising:
   a second access point configured to be coupled to the network and a second forwarding database storing an identifier of a third device coupled to the network;
   the first access point configured to compare the identifier of the second device with the identifier of the third device stored in the second forwarding database; and
   the first access point configured to classify the second device as a rogue device when (1) the identifier of the second device matches the identifier of the third device stored in the second forwarding database and (2) a packet from the third device does not include the fingerprint.

8. A system as recited in claim 7, wherein the first access point is configured to be coupled to the network via a seed switch and the second access point is coupled to the network via a member switch.

9. A system as recited in claim 1, wherein the access point is configured to disrupt communications between the second device and the network if the second device is classified as the rogue device.

10. A system as recited in claim 1, wherein the second device is an unknown client.

11. The system of claim 1, wherein the access point is configured to be coupled to the network such that the fingerprint is distributed to the first device, which is legitimately coupled to the network and not the second device.

12. The system of claim 1, wherein the access point is configured to be coupled to the network such that the fingerprint is distributed to devices connected to a wired portion the network.

13. The system of claim 1, wherein the fingerprint is a pseudo-random number.

14. The system of claim 1, wherein the period of time is a predetermined period of time.

15. The system of claim 1, wherein the fingerprint has a value other than an identifier for a device.

16. An apparatus, comprising:
   a countermeasure module configured to be coupled to (1) a network associated with a fingerprint unique to the network and (2) a forwarding database storing an identifier for a first device coupled to the network, the fingerprint having a value other than an identifier for the network and the value of the fingerprint being changed after a period of time;
   the countermeasure module configured to receive an indication that (1) a second device coupled to the network is assigned with an identifier corresponding to the identifier of the first device and (2) a packet sent from the second device does not include the fingerprint; and
   the countermeasure module configured to disrupt communication between the second device and the network in response to the indication.

17. The apparatus as recited in claim 16, further comprising a port configured to be connected to an access point detecting the identifier of the first device and the identifier of the second device.

18. The apparatus as recited in claim 16, further comprising an access point configured to operate in a promiscuous mode to define an access point database and client database.

19. The apparatus as recited in claim 16, wherein the countermeasure module is a first countermeasure module, the apparatus further including the forwarding database, the forwarding database configured to be operatively coupled to a second countermeasure module coupled to the network.

20. The apparatus as recited in claim 16, wherein the countermeasure module is configured to send at least one of a deauthenticate packet or a disassociate packet to the second device.

21. A method, comprising:

receiving a packet, from a network associated with a fingerprint, at an access point, the fingerprint being unique to the network and the fingerprint having a value other than an identifier for the network and the value of the fingerprint being changed after a period of time;

detecting an identifier of a first device in the packet;

comparing the identifier of the first device with an identifier of a second device stored in a database; and classifying the first device as rogue if (1) the identifier of the first device matches the identifier of the second device stored in the database and (2) the packet from the first device does not include the fingerprint.

22. A method as recited in claim 21, further comprising operating an access point in a promiscuous mode to define the database.

23. A method as recited in claim 21, wherein the database is a first database associated with a first access point further comprising:

comparing the identifier of the first device with an identifier of a third device stored in a second database associated with a second access point; and classifying the first device as a rogue device if (1) the identifier of the first device matches the identifier of the third device stored in the second database and (2) the packet from the first device does not include the fingerprint.

24. A method as recited in claim 21, further comprising disrupting communication between the first device and a network including the access point in response to classifying the first device as a rogue device.

* * * * *

UNITED STATES PATENT AND TRADEMARK OFFICE
CERTIFICATE OF CORRECTION

PATENT NO. : 8,638,762 B2  
APPLICATION NO. : 11/351104  
DATED : January 28, 2014  
INVENTOR(S) : Manish Tiwari Page 1 of 1

It is certified that error appears in the above-identified patent and that said Letters Patent is hereby corrected as shown below:

Title Page, item [63] Related U.S. Application Data add

Provisional application no. 60/727,025, filed on Oct. 13, 2005

Signed and Sealed this  
Twenty-second Day of April, 2014

Michelle K. Lee  
*Deputy Director of the United States Patent and Trademark Office*